United States Patent [19]

Aihara

[11] 4,430,143
[45] Feb. 7, 1984

[54] TIRE BUILDING MACHINE

[75] Inventor: Tohru Aihara, Hiratsuka, Japan

[73] Assignee: The Yokohama Rubber Co., Ltd., Tokyo, Japan

[21] Appl. No.: 393,769

[22] Filed: Jun. 30, 1982

[30] Foreign Application Priority Data

Jul. 3, 1981 [JP] Japan .................. 56-104247

[51] Int. Cl.³ .............................. B29H 17/22
[52] U.S. Cl. .................. 156/403; 156/131; 414/911
[58] Field of Search ............... 156/126, 131, 396, 398, 156/403, 406.2; 414/222, 225, 749, 751, 911

[56] References Cited

U.S. PATENT DOCUMENTS

| | | | |
|---|---|---|---|
| 2,477,718 | 8/1949 | Breth | 156/403 |
| 3,915,788 | 10/1975 | Hirata et al. | 156/131 |
| 4,007,080 | 2/1977 | Klopper | 156/126 |
| 4,053,342 | 10/1977 | Appleby et al. | 156/131 |
| 4,190,482 | 2/1980 | Yabe | 156/403 |
| 4,369,086 | 1/1983 | Nakahama et al. | 156/403 |

Primary Examiner—Edward C. Kimlin
Assistant Examiner—F. K. Wine
Attorney, Agent, or Firm—Armstrong, Nikaido, Marmelstein & Kubovcik

[57] ABSTRACT

The band transfer device is provided between the band building device and tire building device, and on the side of the band transfer device facing the tire building device, is provided a bead supply means. This bead supply means comprises a bead retaining part having a plurality of divided segments movable in the radial direction and arranged in an expansible ring, and a bead kicking means for kicking a bead retained on the bead retaining part onto the bead ring of the tire building device.

5 Claims, 7 Drawing Figures

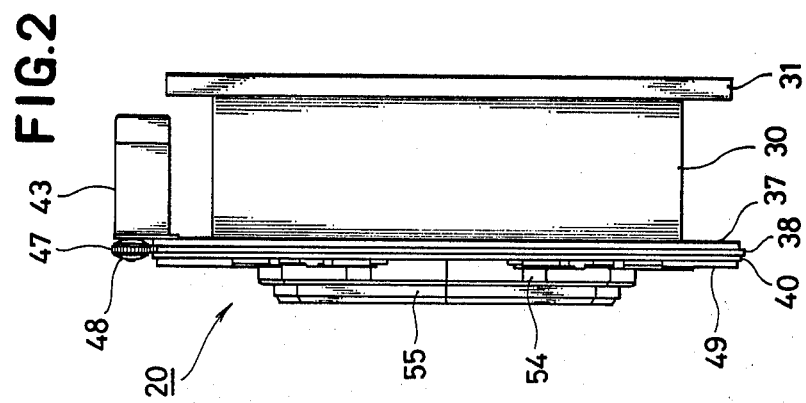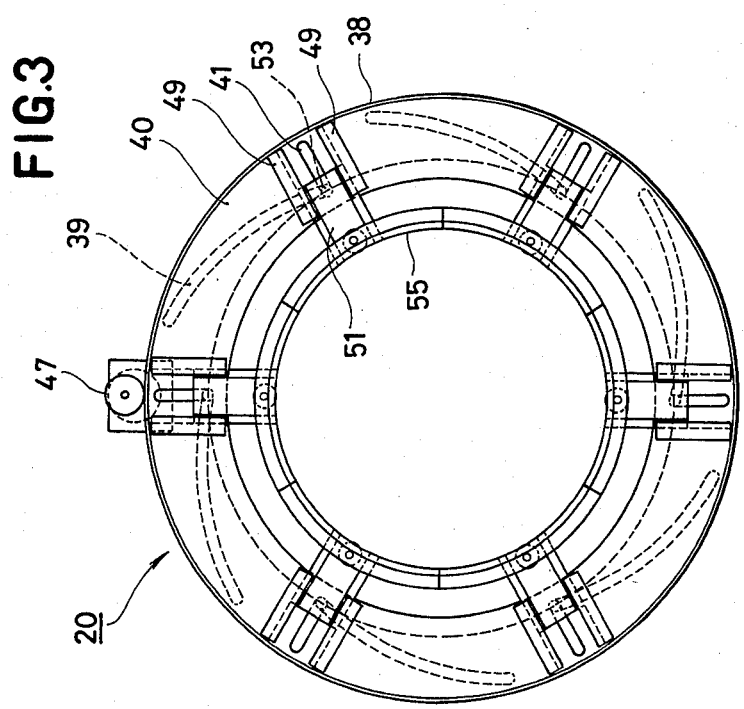

TIRE BUILDING MACHINE

BACKGROUND OF THE INVENTION

The present invention relates to a tire building machine, particularly to a tire building machine in which beads are supplied automatically to a bead ring of a bead setter on the head stock side when building green tires by means of a tire building device.

In general, a tire building machine comprises a band building device, a tire building device and a band transfer device moving these two devices. In more detail, the band building device is for building unvulcanized rubber bands by collecting and adhering unvulcanized rubber sheets or rubber containing cords on its building drum. The band transfer device transfers this rubber band to the building drum of the tire building device. The tire building device receives the rubber band thus transferred by the band transfer device on its building drum, attaches a bead to either end of the rubber band, and then builds a green tire, that is, an unvulcanized intermediate tire. This tire building device includes the building drum positioned in the center and two bead setters on the both sides thereof, that is, on the head stock side and on the tail stock side.

In the building of the above-mentioned kind of green tire by means of the tire building device having this construction, it is necessary to preliminarily set the bead at the bead ring of the bead setter on the head stock side prior to mounting the rubber band on the building drum by means of the band transfer device. This is because once the rubber band is mounted on the building drum, the rubber band having a relatively large diameter becomes an obstacle for the bead passing over the outer periphery of the building drum to the bead setter on the head stock side.

According to the prior art, beads are supplied to the bead setter on the head stock side manually by an operator. For carrying out this bead supply to the bead setter, however, only a very short period of time is permitted for the operator within one cycle of building one green tire, that is, between the time when the green tire in the precedent cycle is removed from the building drum of the tire building device and the time when the rubber band for a green tire in the subsequent cycle is mounted on the building drum. In addition to the bead supply operation thus restricted in time, the operator is usually very busy with the main operator of the machine itself, and also with a number of preparatory operations such as the removing the bead from a rack, mounting a sidewall on an applier and putting the thus built tires in order. Accordingly, the main operation as well as the other preparatory operations mentioned above are obliged to receive unfavorable influence by the time-restricted operation which naturally takes priority. As a result of this, the time required for one cycle of operation is elongated, which decreases the workability.

SUMMARY OF THE INVENTION

The main object of the present invention is therefore to provide a tire building machine which permits an automatic bead supply to the bead setter on the bead stock side instead of the manual operation.

The other object of the present invention is to provide a tire building machine which can reduce the time required for each cycle of building a green tire, thereby improving the productivity.

According to the present invention, these objects can be achieved by a tire building machine having the following construction;

That is, this tire building machine comprises a band building device for building the band, a tire building device arranged separate from the band building device, and a band transfer device arranged movably between the band building device and tire building device for transferring the band built by the band building device to the building drum of the tire building device. The band transfer device includes a bead supply means on the side confronting the tire building device. This bead supply means comprises a bead retaining part having a plurality of divided segments arranged in a ring movable in the radial direction of the ring, the ring being expansible, and a bead kicking means for kicking the bead retained on the bead retaining part onto a bead ring of the tire building device.

The tire building device in the tire building machine includes a building drum positioned in the center and bead setters on the both sides, that is, on the head stock side and the tail stock side. The bead supply means is adapted to supply beads on the bead retaining part to the bead setter on the head stock side.

Further objects of the present invention will become clear from the following description taken in conjunction with the accompanying drawings wherein several preferred embodiments are shown.

BRIEF DESCRIPTION OF THE DRAWINGS

FIG. 2 is a side view of a bead supply means provided in the front part of the band transfer device in the tire building machine shown in FIG. 1;

FIG. 3 is a front view of the band supply means;

DETAILED DESCRIPTION OF THE PREFERRED EMBODIMENTS

Figure 1:
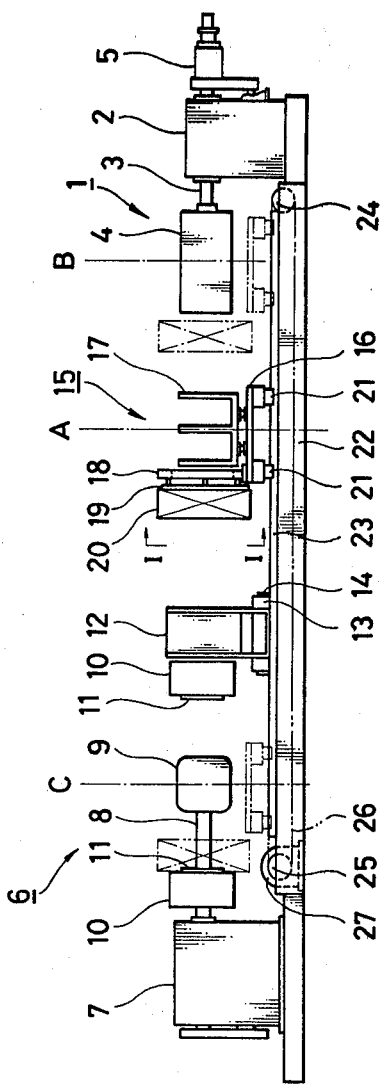
FIG. 1 is a side view of a tire building machine according to an embodiment of the present invention.

In FIG. 1, reference numeral 1 deontes the band building device, 6 the tire building device, and 15 the band transfer device. In the band building device 1, a main shaft 3 is supported on a head stock and secured at one end to a building drum 4. The building drum 4 is adapted to be expanded and contracted in the radial direction by an expanding means 5 provided at the rear part of the head stock 2. In order to build a rubber band, the building drum 4 is kept in the expanded state so that unvulcanized rubber sheet or rubber containing cords is adhered on the drum 4 to build the band. In order to remove thus built rubber band from the building drum 4, the radius of the drum is contracted.

In the tire building device 6, a main shaft 8 is supported on a head stock 7 fixedly secured to a base. A building drum 9 is provided at the end part of the main shaft. This building drum 9 is also adapted to expand and contract in the radial direction. A ply locking means 10 is provided on the main shaft 8 and inside the building drum 9, which has a bead setter 11 on the building drum 9 side. The ply locking means 10 squeezes the end part of the rubber band mounted on the building drum 9 in the diameter direction, sets a bead at the rubber band end part by means of the bead setter 11, and after that, folds the end part of the rubber band so as to wrap the thus placed bead. A tail stock frame 12 is provided on the free end side of the building drum 9, which has also similar ply locking means 10 and bead setter 11 on the side confronting the building drum 9. This tail stock frame 12 is born by a bearing 13 at the lower end and further swingably supported by a shaft 14 to tilt backward with respect to the aligning plane to the devices. For example, when the band transfer device 15 moves from a position A to another position C, the tail stock frame 12 tilts backward so as to permit it to pass.

The band transfer device 15 is mounted on a truck 16. The truck 16 is provided with a band gripping arm 17 as well as a stationary frame 18. This stationary frame 18 is provided on the tire building device 6 side with a bead supply means 20 mounted on a ring-shaped plate 19. The truck 16 has a plurality of bearings 21 fixed to the bottom through which the truck 16 is born on a rail 23. The rail is fixed to a rail base 22 and comprises two rail members running parallel in the moving direction of the truck 16. At the two ends of the rail base 22 are provided a pair of sprockets 24 and 25, one for each end, which are bridged by a chain 26. The chain 26 is connected to the truck 16 at the both ends. The sprocket 25 is driven by a motor 27 with a reduction gear. In operation, the band transfer device 15 is moved reciprocatingly between the band building device 1 and tire building device 6 along the rail 23 through the truck 16 by operating the motor 27 with reduction gear.

One cycle of green tire building operation by the tire building machine thus constructed is as follows:

At first, the band transfer device is usually at a stand-by position A in FIG. 1. At an appropriate timing while the band transfer device 15 is at the stand-by position A, an operator sets a bead in the bead supply means 20. When the band building device finishes the band building operation, the motor 27 with a reduction gear operates to move the band transfer device 15 from the stand-by position A to a position B indicated in an imaginary line in FIG. 1, where the band gripping arm of the band transfer device 15 grips the rubber band built by the band building device 1. Next, the building drum 4 of the band building device 1 contracts and then the band transfer device 15 returns to the stand-by position A with the built rubber band.

Subsequently, the green tire building cycle is finished in the tire building device 6 and the building drum 9 of the device 6 contracts in its diameter so that the built green tire can be removed therefrom. Then the band transfer device 15 at the stand-by position A advances to a position C as indicated in a dot-and-chain line at which the transferred rubber band surrounds the building drum 9 of the tire building device 6. During this movement of the band transfer device 15, the tail stock frame 12 is preliminarily tilted in the backward shunting position by a drive means not shown, to allow the band transfer device 15 to pass it smoothly.

With the band transfer device 15 at position C, the bead supply means 20 confronts the head setter 11 in a state which allows the bead retained in the bead supply means 20 to be transferred to the bead ring of the bead setter 11. In more detail, in the above state, the bead in the bead supply means 20 is kicked out to the bead ring of the bead setter 11. At the same time, the building drum 9 expands its diameter and also the band gripping arm 17 expands its gripping width, so that the rubber band gripped by the band gripping arm 17 is transferred onto the building drum 9 of the tire building device 6.

Thereafter, when the band transfer device 15 moves slightly to the stand-by position A side, the bead retaining part 55, which will be described in detail later, provided at the front part of the bead supply means 20 expands to be larger in the diameter than the outer diameter of the rubber band mounted on the building drum 9 of the tire building device 6. Then, the band transfer device 15 returns to the stand-by position A, whereas the bead retaining part 55 contracts until its bead retaining seat diameter becomes identical with the inner diameter of the bead. On the other hand, the tail stock frame 12 returns to its standing position. After that, the green tire building operation is performed in the tire building device 6 which is finished by removing the built green tire from the building drum 9 of the device 6. This is one complete cycle of the tire building operation.

FIGS. 2 to 5 show the bead supply means 20 mounted on the band transfer device 15 in detail. The ring-shaped plate 19 of the band transfer device 15 is fixed with a cylindrical frame 30 through a flange 31 by means of a bolt 33. A hole 29 through which the bolt is inserted is made elongated so that the axial core of the bead supply means 20 can be adjusted by an adjustment of a bolt 34 screwed in from the outer peripheral surface of the flange 31 so as to align with the axial core of the bead setter 11 of the tire building device 6. Another flange 35 on the front side of the cylindrical frame 30 is fixed with an annular base ring 37 by means of a bolt 36. This base ring 37 is fixed on the front side with a keeper ring 40, with a gap defined therebetween into which a cam ring 38 is coaxially and rotatably inserted. The cam ring 38 is provided with a plurality of cam grooves 39 extending from the inner diameter side to the outer diameter side and spaced at equal intervals along the circumference. In this particular embodiment, the cam grooves are formed in an arch shape. The same effect can be obtained if they are formed in a straight line. The cam ring 38 is also provided with a gear 42 carved on a part of its outer peripheral surface with which a pinion gear 47 engages. The pinion gear 47 is fixed to an output shaft 46 of a motor 43 with a reduction gear through a torque limiter 48. The flange 44 of the motor 43 with a reduction gear is fixed to the base ring 37 by a bolt 45.

On the outer surface side of the keeper ring 40 are fixed a pair of parallel guide blocks 49, 49 each having an L-shaped cross section and being directed in the radial direction. Between this pair of guide blocks 49, 49, a block 51 is slidably inserted along the longitudinal direction of the guide blocks 49. A shaft 52 is fixed at the outer end part of the block 51 in the radial direction as a cam follower. The shaft 52 passes through elongated slits 41 pierced in the radial direction in the keeper ring 40 and is provided with a roller 53 at its tip end, which roller engages with the cam groove 39 of the cam ring 38. Accordingly, when the cam ring 38 is rotated by the motor 43 with a reduction gear, the block 51 is moved in the radial direction via the roller 53 and shaft 52.

Figure 4:
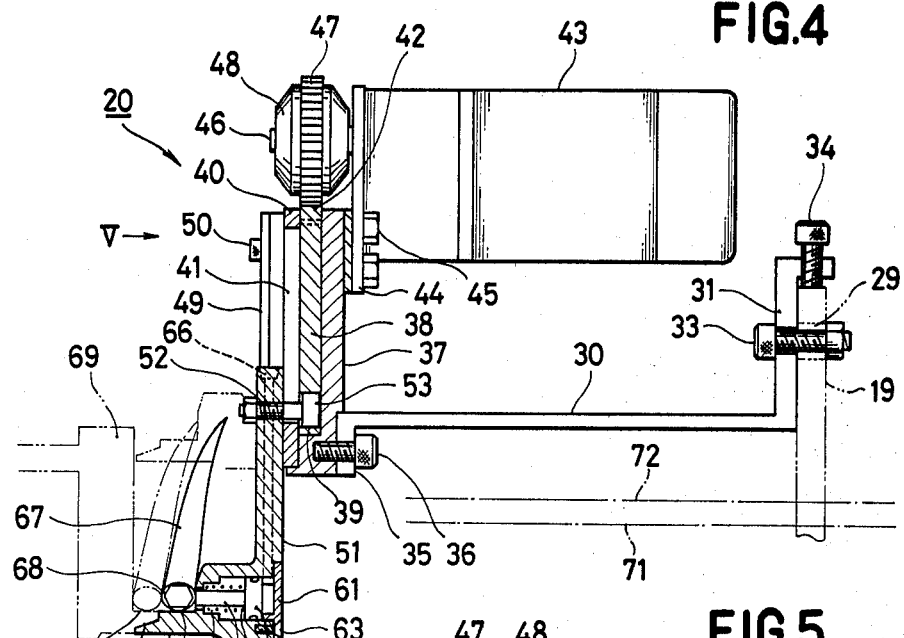
FIG. 4 is a partially cross sectioned side view of an important part of the bead supply means.
Figure 5:
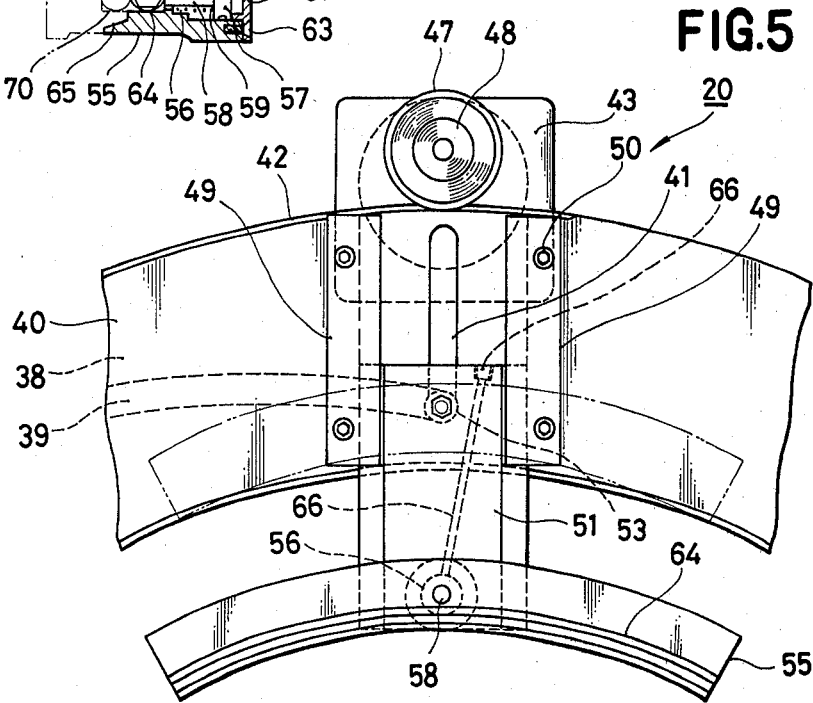
FIG. 5 is a view seen in the direction V in FIG. 4.

On the other hand, a bead retaining part 55 is integrally fixed with the inner diameter side end part of the block 51. This bead retaining part comprises a plurality of divided segments which are so arranged as to form a ring as a whole. The outer peripheral surface of the bead retaining part 55 works as a bead seat surface 64. The number of divided segments can be arbitrarily selected, although there are six in the illustrated embodiment. A sloping guide surface 65 is formed continuous with the front edge in the forward direction of the bead seat surface. The guide surface 64 is so formed to engage with that provided in the bead ring 69 of the bead setter 11 of the tire building device 6. When these guide surfaces engage, the bead set surface 70 of the bead ring 69 and the bead seat surface 64 of the bead retaining part 55 form a single stepless and continuous plane. In FIG. 4, the reference numeral 71 denotes the outer diameter position of the building drum of the tire building device 6 when it is expanded. Reference numeral 72 denotes the outer diameter position of the transferred rubber band. A cylinder chamber 56 is formed in the lower end part of the block 51, into which a piston 57 is inserted. Further, a rod 58 integrally fixed to the piston 57 extends through the chamber 56 of the bead seat surface 64 side. The rod 58 is provided with a coil spring 59 which normally biases the piston 57 to the right in FIG. 4. A cover 61 is fixed to the back of the cylinder chamber 56 by a bolt 63. An air passage 66 extends from the upper end surface of the block 51 to the cylinder chamber 56 to communicate the latter with a compressed air source (not shown). Accordingly, when compressed air is supplied to the cylinder chamber 56, the piston 57 is pushed to the left in FIG. 4, and the tip of the rod 58 pushes a wire part 68 of the bead 67 into the bead ring 69 and thereby transfers the bead. In more detail, the bead 67 on the bead seat surface 64 of the bead retaining part 55 in the bead supply means 20 is transferred to the bead seat surface 70 of the bead ring 69 of the bead setter 11 in the tire building device 6.

When the bead supply means 20 is retracted together with the band transfer device 15 to separate the guide surface 65 of the bead retaining part 55 smoothly, the band transfer device is first moved slightly toward the stand-by position A. After this slight movement, the motor 43 with a reduction gear is rotated in the reverse direction to rotate the cam ring 38 so that the dimension of the bead retaining part 55 is expanded up to the position indicated by the dot-and-chain line in FIGS. 4 and 5, and thereafter, the band transfer device 15 is returned to its stand-by position A.

Figure 6:
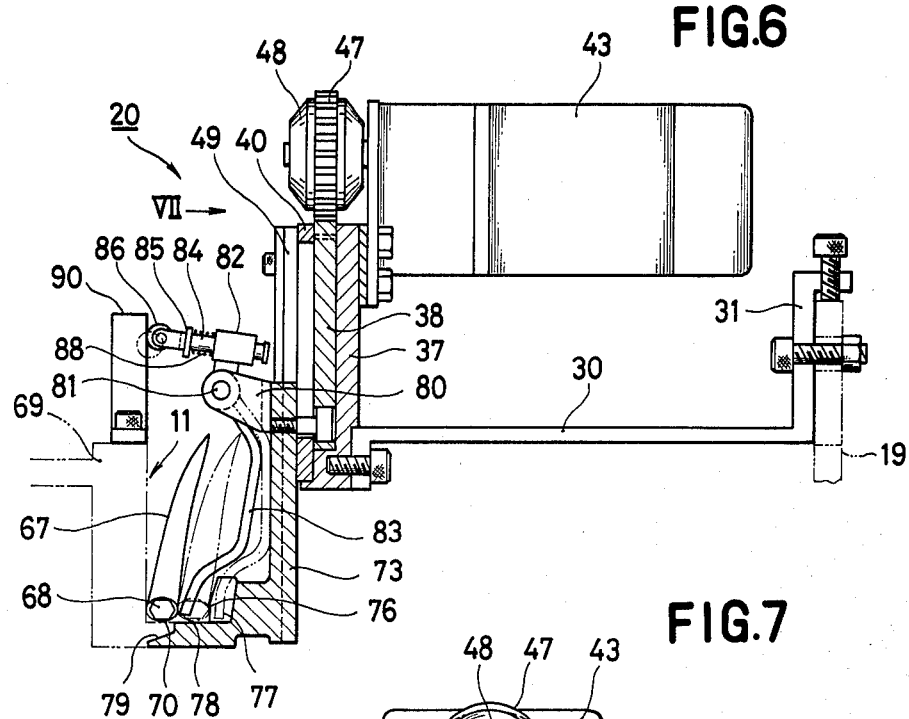
FIG. 6 is a side view of the important part of the bead supply means according to another embodiment of the present invention with a part shown in the cross section.
Figure 7:
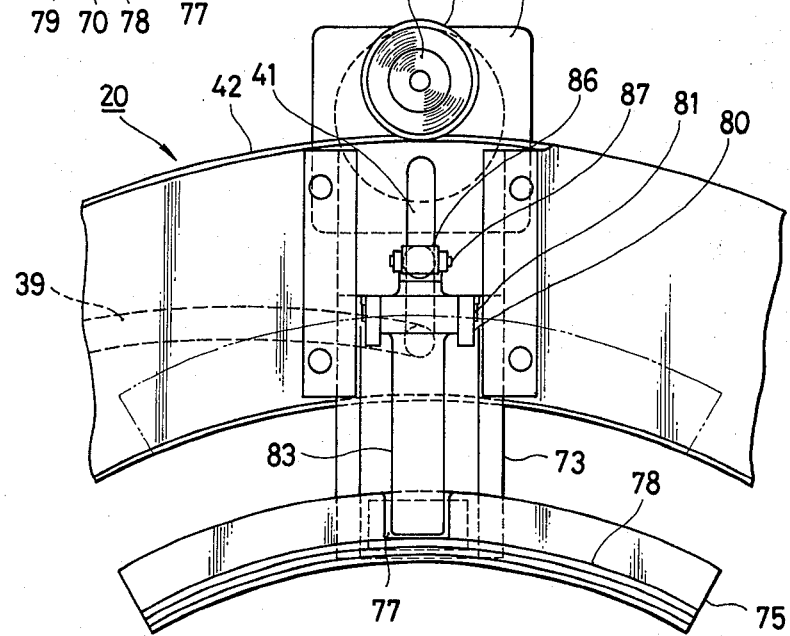
FIG. 7 is a front view seen in the direction VII in FIG. 6.

A second embodiment illustrated in FIGS. 6 and 7 is substantially the same as the first embodiment except in the construction of the bead kicking means.

In FIGS. 6 and 7, reference numeral 73 corresponds to the block 51 in the first embodiment, and the bead retaining part 75 is secured integrally fixed to the lower end part of the block 73. The bead retaining part 75 has the bead seat surface on which the bead 67 is retained. To the side end part of the outer diameter of the block 73 is fixed a bracket 80 which, in turn, swingably supports a kicking arm 83 through a shaft 81. Also, a recessed part 77 is formed in a position corresponding to the bead seat surface 78 on the side end part of the inner diameter of the block 73. One end of the kicking arm 83 faces the recessed part 77. Provided at the other end of the arm 83 is a boss 82, which slidably engages with the rod 84 which rotatably supports a roller 86 at its front end in contact against a stopper 90 fixed to the bead ring 69. A coil spring 88 is bridged between the flange 85 of the rod 84 and the boss 82 of the kicking arm 83 to normally bias the rod 84 out of the boss 82. In other words, the end part of the arm 83 is normally housed within the recessed part 77.

Accordingly, in the bead supply means 20 of this particular embodiment, since the roller 86 at the tip end of the rod 84 is pushed back by the stopper 90 when the band transfer device 15 approaches the position C, arm 83 swings around axis 81 so that the other end housed in the recessed part 77 pushes out the wire part 68 of the bead 67. The bead 67 is consequently transferred to the bead seat surface 70 of the bead ring 69 in the tire building device 6.

As described in the foregoing, according to the tire building machine wherein the band transfer device is positioned between the band building device and tire building device, and the bead supply means is positioned on the side facing the tire building device in the band transfer device, the bead can be automatically supplied to the bead setter on the head stock side of the tire building device at the same time as the rubber band built by the band building device is transferred to the tire building device. Therefore, it is sufficient for the operator to prepare beads for the bead supply means in appropriate free time during the main operation, greatly increasing the freedom of the timing for bead preparation. This results in greatly reducing the amount of time required for one cycle of the tire building operation, and hence in an improvement in the productivity of tire building.

What is claimed is:

1. A tire building machine comprising:
   a band building device for building bands,
   a tire building device provided at a position spaced from said band building device, said tire building device including a green tire building drum positioned in the center and bead setters on the both sides, that is, on the head stock side and the tail stock side, and
   a band transfer device movably provided between said band building device and tire building device to transfer said band built by said band building device to the building drum of said tire building device,
   said band transfer device having a bead supply means on the side facing said tire building device, said bead supply means comprising a bead retaining part having a plurality of divided segments arranged in a ring and movable in the radial direction of the ring, said ring being expansible, and a bead kicking means for kicking a bead retained on said bead retaining part out onto the bead ring of said tire building device while said band transfer device surrounds said building device, said bead supply means being adapted to supply beads on the bead retaining part to said bead setter on the head stock side.

2. A tire building machine according to claim 1, wherein the axial core of the building drum for building green tires in said tire building device and that of the building drum for building bands in said band building device are arranged coaxially.

3. A tire building machine according to claim 1, wherein said bead kicking means in said bead supply means comprises a piston rod to be operated by compressed air.

4. A tire building machine according to claim 1, wherein said bead kicking means in said bead supply device comprises a lever swingable around a fulcrum, one end of which is formed as a bead kicking part and the other end of which is formed as a part which collides against a stopper.

5. A tire building machine according to claim 1, wherein means for moving said divided segments in said bead retaining part in the radial direction comprises a cam ring rotated by a drive motor and a block which engages with a cam groove cut slantwise in said cam ring so as to be guided in the radial direction.

* * * * *